(12) United States Patent
Chang

(10) Patent No.: US 8,219,824 B2
(45) Date of Patent: Jul. 10, 2012

(54) STORAGE APPARATUS, MEMORY CARD ACCESSING APPARATUS AND METHOD OF READING/WRITING THE SAME

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 983 days.

(21) Appl. No.: 11/771,112

(22) Filed: Jun. 29, 2007

(65) Prior Publication Data

US 2009/0006866 A1 Jan. 1, 2009

(51) Int. Cl.
*G06F 21/00* (2006.01)

(52) U.S. Cl. ........ 713/183; 711/152; 711/153; 717/155; 709/212

(58) Field of Classification Search ................... 713/183; 711/152, 153, 161, 163, 164, 173; 709/212–216; 717/155; 705/18
See application file for complete search history.

(56) References Cited

U.S. PATENT DOCUMENTS

| | | | | |
|---|---|---|---|---|
| 5,649,118 | A * | 7/1997 | Carlisle et al. | 705/41 |
| 6,453,369 | B1 * | 9/2002 | Imamura et al. | 710/36 |
| 7,124,301 | B1 * | 10/2006 | Uchida | 713/189 |
| 2002/0019974 | A1 * | 2/2002 | Iizuka | 717/107 |
| 2002/0144270 | A1 * | 10/2002 | Mizushiro et al. | 725/55 |
| 2002/0174287 | A1 * | 11/2002 | Cheng | 711/103 |
| 2003/0115472 | A1 * | 6/2003 | Chang | 713/182 |
| 2004/0025031 | A1 * | 2/2004 | Ooi et al. | 713/186 |
| 2004/0054555 | A1 * | 3/2004 | Piccionelli et al. | 705/1 |
| 2004/0139255 | A1 * | 7/2004 | Cheng | 710/74 |
| 2005/0086471 | A1 * | 4/2005 | Spencer | 713/165 |
| 2005/0195975 | A1 * | 9/2005 | Kawakita | 380/30 |
| 2006/0070125 | A1 * | 3/2006 | Pritchard et al. | 726/18 |
| 2006/0080562 | A1 * | 4/2006 | Ooshima et al. | 713/300 |
| 2006/0168395 | A1 * | 7/2006 | Deng et al. | 711/113 |
| 2006/0173762 | A1 * | 8/2006 | Clater | 705/35 |
| 2006/0200628 | A1 * | 9/2006 | Cheng et al. | 711/115 |
| 2006/0230285 | A1 * | 10/2006 | Takao | 713/184 |
| 2006/0294599 | A1 * | 12/2006 | Sim et al. | 726/34 |
| 2007/0158439 | A1 * | 7/2007 | Conner et al. | 235/492 |

FOREIGN PATENT DOCUMENTS

| | | |
|---|---|---|
| CN | 1916814 A | 2/2007 |
| TW | 200702995 | 1/2007 |
| WO | WO 2007/033321 A2 | 3/2007 |

OTHER PUBLICATIONS

Chinese First Examination Report of China Application No. 2007101096444, dated Jun. 19, 2009.
Chinese Examination Report of Taiwan Application No. 096118072, dated Jan. 19, 2011.

* cited by examiner

*Primary Examiner* — Kim Vu
*Assistant Examiner* — Sayed Beheshti Shirazi
(74) *Attorney, Agent, or Firm* — J.C. Patents

(57) ABSTRACT

A storage apparatus having a non-volatile memory and a controller is provided, wherein the non-volatile memory includes a root directory area and a data area, and a password file is stored in the root directory area. The controller identifies a user by using a password in the password file, and the user can access the data area through an encryption/decryption unit of the controller only if the user passes the identification. By using the secured storage apparatus, the risk of the password and encrypted data being cracked is reduced. Accordingly, the protection over the data stored in the storage apparatus is enhanced.

18 Claims, 3 Drawing Sheets

STORAGE APPARATUS, MEMORY CARD ACCESSING APPARATUS AND METHOD OF READING/WRITING THE SAME

BACKGROUND OF THE INVENTION

1. Field of the Invention

The present invention generally relates to a storage apparatus, a memory card accessing apparatus, and methods of reading/writing the same, in particular, to a secured storage apparatus, a secured memory card accessing apparatus, and methods of reading/writing the same.

2. Description of Related Art

A memory card is a data storage device, and a flash memory is usually used therein as the storage media thereof. A flash memory is an electrically erasable programmable read-only memory (EEPROM) and which offers high re-record-ability, power-free storage etc. Besides, a flash memory is a kind of non-volatile memory therefore it has the advantages of non-volatile memories such as small volume, high accessing rate, and low power consumption. Moreover, a flash memory has high operation rate because easing data stored therein is made in a unit of block.

Memory card has been broadly applied to personal data storage due to its characteristics of small volume, large capacity, and portability. However, if a memory card is lost, the data stored therein may also be stolen.

To resolve foregoing problem, a password identification program is usually stored in a memory card. A user has to execute the password identification program in a host when the user plugs the memory card into the host. The password identification program may compare the password entered by the user with the one stored in the memory card. If the two passwords do not match or the password identification program is not executed, the host only detects part of the memory space in the memory card so that the user cannot read all the data stored in the memory card. If the two passwords match each other, then the user can use the entire memory card as normal.

However, according to the method described above, the password stored in the memory card has to be read (for example, into the host) to be compared with the password entered by the user, which increases the risk of the password being cracked. Moreover, the password identification program can be easily cracked even without a password for it is executed in the host. Accordingly, the personal data of the user may be stolen once the password identification program or the password is cracked.

SUMMARY OF THE INVENTION

Accordingly, the present invention is directed to a storage apparatus which reduces the risk of a password and encrypted data being cracked, and accordingly, protects the personal data stored in the storage apparatus against theft.

The present invention is directed to a memory card accessing apparatus which reduces the risk of a password and encrypted data being cracked, and accordingly, protects the personal data stored in a memory card against theft.

The present invention provides a method of reading/writing a storage apparatus, wherein the method reduces the risk of a password and encrypted data being cracked, and accordingly, protects the personal data stored in the storage apparatus against theft.

The present invention provides a method of reading/writing a memory card accessing apparatus, wherein the method reduces the risk of a password and encrypted data being cracked, and accordingly, protects the personal data stored in a memory card against theft.

The present invention provides a storage apparatus including a non-volatile memory, a controller, and an encryption/decryption unit. The non-volatile memory includes a root directory area and a data area, wherein a password file containing a personal password is stored in the root directory area. The controller is electrically connected to the non-volatile memory and is used for controlling the operation of the storage apparatus and communicating with a host through a universal interface. The encryption/decryption unit is disposed in the controller and has a key. The controller detects whether the password file is written, and the controller triggers a password comparison operation when a user of the host writes into the password file. During the password comparison operation, the controller compares the password entered by the user with the personal password stored in the password file in order to identify the user. If the password entered by the user matches the personal password in the password file, the user is allowed to access the data stored in the data area, and if the password entered by the user does not match the personal password in the password file, the user is prohibited from accessing the data stored in the data area. The encryption/decryption unit uses the key to encrypt and decrypt the data stored in the data area of the non-volatile memory.

According to an embodiment of the present invention, the non-volatile memory is a flash memory.

According to an embodiment of the present invention, the flash memory is a NAND flash memory.

According to an embodiment of the present invention, the universal interface is a universal serial bus (USB) interface.

According to an embodiment of the present invention, the universal interface is an IEEE1394 interface.

The present invention provides a memory card accessing apparatus including a controller, a memory card interface, a universal interface, and an encryption/decryption unit. The controller compares a personal password in a password file stored in a memory card and controls the operation of the memory card accessing apparatus. The memory card interface is electrically connected to the controller and is used for communicating with the memory card. The universal interface is electrically connected to the controller and is used for communicating with a host. The encryption/decryption unit is disposed in the controller and has a key. The controller detects whether the password file is written, and the controller triggers a password comparison operation when a user of the host writes into the password file. During the password comparison operation, the controller compares the password entered by the user with the personal password stored in the password file in order to identify the user. If the password entered by the user matches the personal password in the password file, the user is allowed to access the data stored in the memory card, and if the password entered by the user does not match the personal password in the password file, the user is prohibited from accessing the data stored in the memory card. The encryption/decryption unit uses the key to encrypt and decrypt the data stored in the memory card.

According to an embodiment of the present invention, the memory card is a multi-media card (MMC), a secure digital (SD) card, or a compact flash (CF) card.

According to an embodiment of the present invention, the universal interface is a USB interface.

According to an embodiment of the present invention, the universal interface is an IEEE1394 interface.

The present invention provides a method of reading/writing a storage apparatus. The method includes following steps.

First, whether a password file is stored in a root directory area of a non-volatile memory is determined. If the password file is found, a password entered by a user and a personal password stored in the password file are then compared. If the password entered by the user matches the personal password in the password file, the user is allowed to perform a reading operation or a writing operation in a data area of the non-volatile memory, and if the password entered by the user does not match the personal password in the password file, the user is prohibited from performing the reading operation or the writing operation in the data area of the non-volatile memory.

According to an embodiment of the present invention, while performing the writing operation, the storage apparatus first encrypts data to be written using the key and then stores the encrypted data in the data area; and while performing the reading operation, the storage apparatus first decrypts data to be read using the key and then transmits the decrypted data.

The present invention provides a method of reading/writing a memory card accessing apparatus. The method includes following steps. First, whether a password file is stored in a root directory area of a memory card is determined. If the password file is found, a password entered by a user and a personal password stored in the password file are then compared. If the password entered by the user matches the personal password in the password file, the user is allowed to perform a reading operation or a writing operation in a data area of the memory card, and if the password entered by the user does not match the personal password in the password file, the user is prohibited from performing the reading operation or the writing operation in the data area of the memory card.

According to an embodiment of the present invention, while performing the writing operation, the memory card accessing apparatus first encrypts data to be written using the key and then stores the encrypted data in the data area; and while performing the reading operation, the memory card accessing apparatus first decrypts data to be read using the key and then transmits the decrypted data.

According to the present invention, the password and key stored in a storage apparatus are used to protect data, and password comparison and data encryption are both performed for the storage apparatus. Thus, the risk of the password and encrypted data being cracked is reduced. Accordingly, the protection over the data stored in the storage apparatus is enhanced.

According to the present invention, the password stored in a memory card and the key stored in a memory card accessing apparatus are used to protect data, and password comparison and data encryption are both performed for the memory card accessing apparatus. Thus, the risk of the password and encrypted data being cracked is reduced. Accordingly, the protection over the data stored in the memory card is enhanced.

According to the method of reading/writing a storage apparatus provided by the present invention, the password and key stored in the storage apparatus are used for identifying a user and encrypting the data stored in the storage apparatus. Thus, the protection over the data stored in the storage apparatus is enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
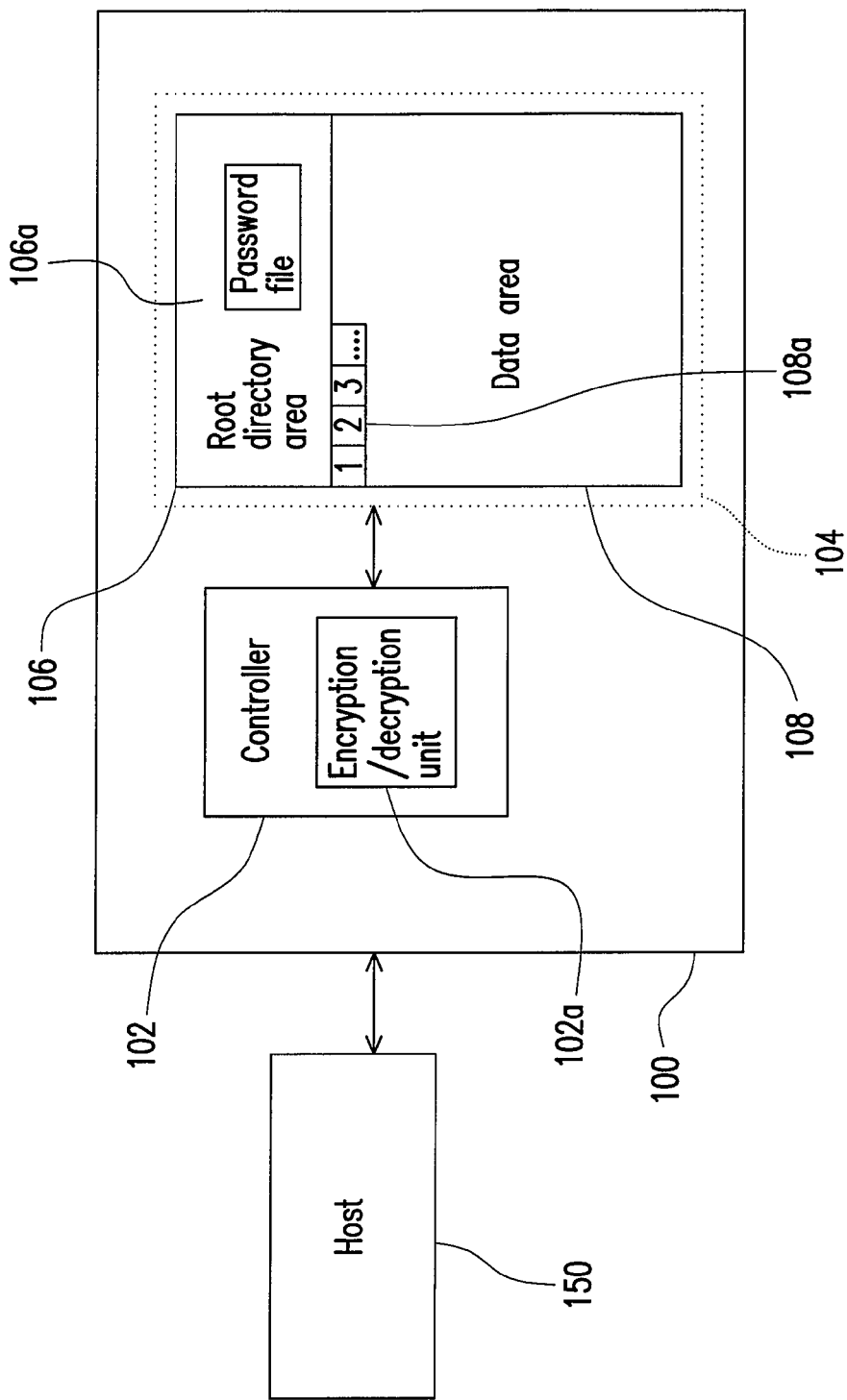
FIG. 1 is a block diagram of a storage apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a storage apparatus 100 according to the first embodiment of the present invention.

Referring to FIG. 1, the storage apparatus 100 includes a controller 102 and a non-volatile memory 104.

The non-volatile memory 104 includes a root directory area 106 and a data area 108. A password file 106a is stored in the root directory area 106, and a personal password may be stored in the password file 106a by a user or an apparatus vendor for identifying the user. The data area 108 includes a plurality of memory cells 108a for storing data. The non-volatile memory 104 may be a flash memory or other storage media. In the present embodiment, the non-volatile memory 104 is a NAND flash memory.

The controller 102 controls the operation of the storage apparatus 100 and communicates with a host 150 through a universal interface (not shown). The controller 102 includes an encryption/decryption unit 102a having a key, wherein the encryption/decryption unit 102a uses this key to encrypt/decrypt the data stored in the data area 108 of the non-volatile memory 104. The operation of the storage apparatus 100 will be described in details below with reference to accompanying drawings.

Figure 2:
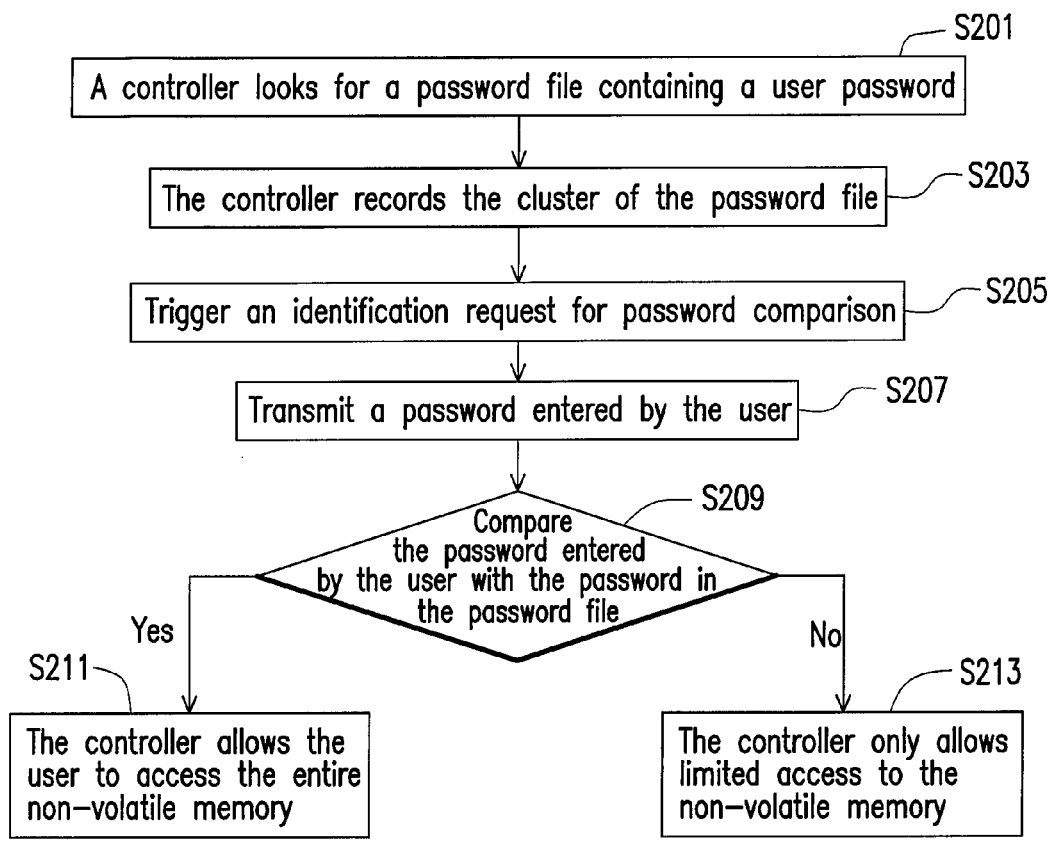
FIG. 2 is a flowchart illustrating a user identification procedure in a storage apparatus according to an embodiment of the present invention.

FIG. 2 is a flowchart illustrating a user identification procedure in the storage apparatus 100 according to the present embodiment of the present invention.

Referring to both FIG. 1 and FIG. 2, when the storage apparatus 100 is plugged into the host 150 (or connected to the host 150) and is turned on, the controller 102 of the storage apparatus 100 reads the information in the root directory area 106 and looks for the password file containing the personal password (step S201). In step S203, after the controller 102 finds the password file, the controller 102 records the cluster of the password file and detects whether the password file is written. An identification request for password comparison is triggered when a user of the host 150 writes into the password file (step S205), and the data written into the password file by the user is the password to be compared (step S207).

When the controller 102 receives the password entered by the user from the host 150, the controller 102 reads the password file from the cluster in the root directory area 106 wherein the password file is recorded and compares the received password with the personal password read from the password file in order to identify the user (step S209). If the two passwords match each other, the controller 102 allows the host 150 to perform a read operation or a write operation in the entire non-volatile memory 104 (step S211). If the two passwords do not match each other, the controller 102 only allows the host 150 to read data in the root directory area 106 of the non-volatile memory 104 and responds 0×00 to any other read operation (step S213).

In the present embodiment of the present invention, the controller 102 determines that no personal password is set if the controller 102 cannot find the password file in the root directory area 106. Thus, the host 150 can perform freely the read operation and the write operation in the entire non-volatile memory 104.

In the present embodiment of the present invention, when the controller 102 cannot find the password file in the root directory area 106 and determines that no personal password is set, the controller 102 allows the host 150 to write a new password file into the root directory area 106 in order to set the personal password and protect the storage apparatus 100. In addition, when the user identification is passed, the controller 102 also allows the host 150 to write a new password file into the root directory area 106 for replacing the old password file in order to set a new personal password and protect the storage apparatus 100.

Figure 3:
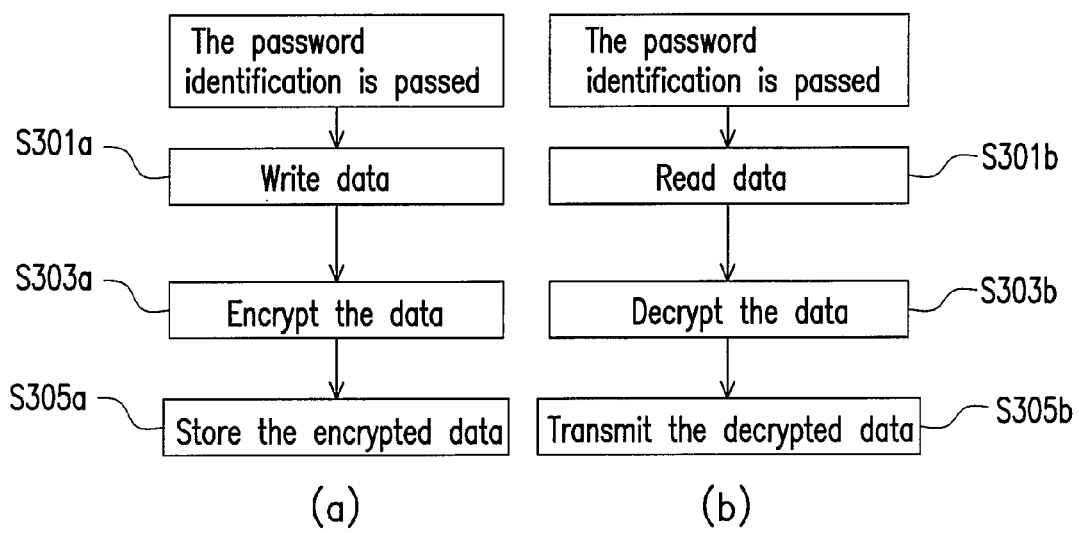
FIG. 3 illustrates the flowcharts of performing a reading operation and a writing operation in a storage apparatus according to an embodiment of the present invention.

FIG. 3 illustrates the flowcharts of the reading operation and the writing operation in the storage apparatus 100 according to the present embodiment of the present invention.

Referring to FIG. 1 and FIG. 3, in the present embodiment, if the host 150 wants to write data into the data area 108 of the non-volatile memory 104 (step S301a) after the user identification is passed, the encryption/decryption unit 102a first encrypts the data to be written using the key stored therein (step S303a) and then stores the encrypted data in the data area 108 (step S305a).

Referring to FIG. 1 and FIG. 3, if the host 150 wants to read data from the data area 108 of the non-volatile memory 104 (step S301b) after the user identification is passed, the encryption/decryption unit 102a first decrypts the data to be read using the key stored therein (step S303b) and then transmits the decrypted data to the host 150 (step S305b).

In the present embodiment of the present invention, the controller 102 may further include a record area (not shown) for recording the number of unsuccessful password comparisons, and when the number of unsuccessful password comparisons exceeds a predetermined threshold (for example, 3), the storage apparatus may be locked so that the data stored in the storage apparatus cannot be accessed.

According to an embodiment of the present invention, a user has to pass the password identification before the user read data stored in a storage apparatus. Moreover, the data stored in the storage apparatus is encrypted by using a hardware key, thus, the protection over the data stored in the storage apparatus is enhanced.

Figure 4:
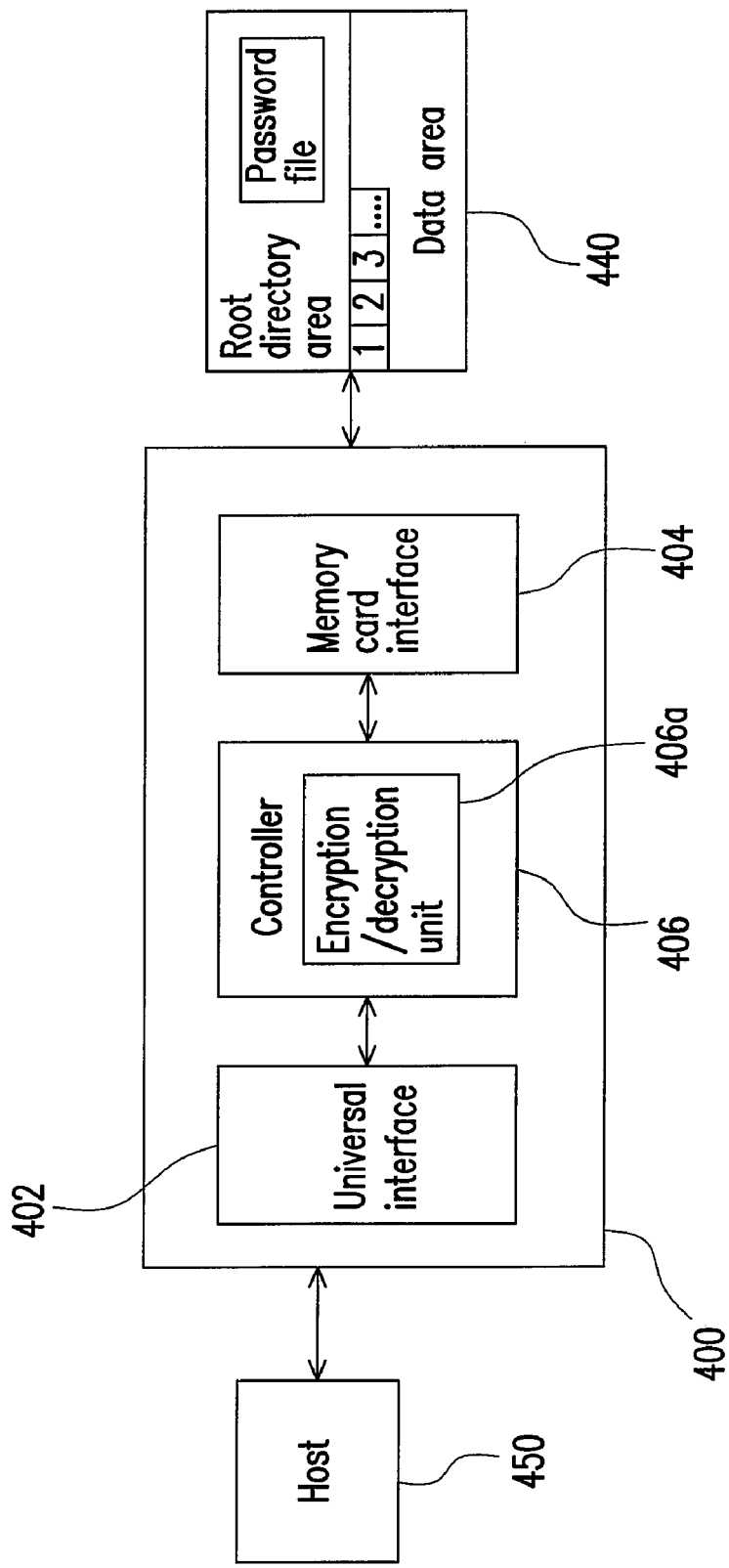
FIG. 4 is a block diagram of a memory card accessing apparatus according to a second embodiment of the present invention.

FIG. 4 is a block diagram of a memory card accessing apparatus 400 according to the second embodiment of the present invention.

Referring to FIG. 4, the memory card accessing apparatus 400 includes a universal interface 402, a memory card interface 404, and a controller 406.

The universal interface 402 is used for communicating with a host 450. The universal interface 402 may be a USB interface, an IEEE1394 interface, or other data communication interface.

The memory card interface 404 is used for communicating with a memory card 440 plugged into the memory card accessing apparatus 400. The memory card interface 404 is a communication interface compatible to MMC, SD card, CF card, or the combination thereof.

The controller 406 controls the operation of the memory card accessing apparatus 400. The controller 406 includes an encryption/decryption unit 406a which is used for encrypting/decrypting the data in the memory card 440. The operation of the memory card accessing apparatus 400 will be described in details below with reference to accompanying drawings.

Referring to both FIG. 2 and FIG. 4, when the memory card 440 is plugged into the memory card accessing apparatus 400 which is connected to the host 450, the controller 406 looks for a password file containing a personal password in the root directory area of the memory card 440 (step S201). After the controller 406 finds the password file, the controller 406 records the cluster of the password file (step S203) and detects whether the password file is written. An identification request for password comparison is triggered when a user of the host 450 writes into the password file (step S205), and the data written into the password file by the user is the password to be compared (step S207).

When the controller 406 receives the password entered by the user from the host 450, the controller 406 reads the password file from the cluster in the memory card 440 wherein the password file is recorded and compares the password received from the host 450 with the personal password read from the password file in order to identify the user (step S209). If the two passwords match each other, the controller 406 allows the host 450 to perform a read operation or a write operation in the entire memory card 440 (step S211). If the two passwords do not match each other, the controller 406 only allows the host 450 to read data in the root directory area of the memory card 440 and responds 0×00 to any other read operation (step S213).

In the present embodiment of the present invention, the controller 406 determines that no personal password is set if the controller 406 cannot find the password file. Thus, the controller 406 allows the host 450 to perform freely the read operation or the write operation in the entire memory card 440.

In the present embodiment of the present invention, when the controller 406 cannot find the password file and determines that no personal password is set, the controller 406 allows the host 450 to write a new password file into the memory card 440 in order to set the personal password and protect the memory card 440. In addition, when the user identification is passed, the controller 406 also allows the host 450 to write a new password file for replacing the old password file in order to set a new personal password and protect the memory card 440.

In the present embodiment of the present invention, as shown in FIG. 3(a), if the host 450 wants to write a data into the memory card 440 (step S301a) after the user identification is passed, the encryption/decryption unit 406a first encrypts the data to be written using the key stored therein (S303a) and then stores the encrypted data in the memory card 440 through the memory card interface 404 (step S305a).

In addition, as shown in FIG. 3(b), if the host 450 wants to read a data from the memory card 440 (step S301b) after the user identification is passed, the encryption/decryption unit 406a first decrypts the data to be read using the key stored therein (step S303b) and then transmits the decrypted data to the host 450 through the universal interface 402 (step S305b).

According to an embodiment of the present invention, a user has to pass the password identification before the user read the data stored in a memory card. Moreover, the data stored in the memory card is encrypted by using a hardware key, thus, the protection over the data stored in the memory card is enhanced by accessing the data with the memory card accessing apparatus in the present embodiment.

In overview, according to the present invention, the storage apparatus has an encryption/decryption unit and a special password file is stored in the memory. Thus, the storage apparatus can identify a user and encrypt the data stored therein. Accordingly, the protection over the personal data is enhanced. Moreover, it is not necessary to use any additional hardware equipment or change any driving program in the host.

According to the present invention, the memory card accessing apparatus has an encryption/decryption unit and stores a special password file in a memory card plugged into the memory card accessing apparatus. Thus, the memory card accessing apparatus can identify a user and encrypt the data stored in the memory card. Accordingly, the protection over the personal data is enhanced. Moreover, it is not necessary to use any additional hardware equipment or change any driving program in the host.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A storage apparatus, comprising:
   a non-volatile memory including a root directory area and a data area, wherein the root directory area is used for storing a password file, and the password file comprises a personal password;
   a controller electrically connected to the non-volatile memory for controlling the operation of the storage apparatus and communicating with a host through a universal interface, the controller is further used for looking for the password file in the root directory area to determine whether the password file is stored in the root directory area; and
   an encryption/decryption unit disposed in the controller and having a key,
   wherein when the controller cannot find the password file in the root directory area, the controller allows the host to write a new password file into the root directory area;
   wherein when the controller finds the password file in the root directory area, the controller records a cluster of the password file and detects whether the password file is written, and the controller triggers a password comparison operation when a user of the host writes a password into the password file,
   wherein during the password comparison operation, the controller compares the password with the personal password stored in the password file from the cluster in order to identify the user, and if the password matches the personal password in the password file, the controller allows the host to access the data stored in the data area, while if the password does not match the personal password in the password file, the controller only allows the host to read data in the root directory area and responds a predetermined response to any other read operation for reading the data stored in the data area.

2. The storage apparatus according to claim 1, wherein the encryption/decryption unit uses the key to encrypt and decrypt the data stored in the data area of the non-volatile memory.

3. The storage apparatus according to claim 1, wherein the non-volatile memory is a flash memory.

4. The storage apparatus according to claim 3, wherein the flash memory is a NAND flash memory.

5. The storage apparatus according to claim 1, wherein the universal interface is an universal serial bus (USB) interface.

6. The storage apparatus according to claim 1, wherein the universal interface is an IEEE1394 interface.

7. A memory card accessing apparatus, comprising:
   a controller, for looking for a password file in a root directory area of a memory card to determine whether the password file is stored in the root directory area, and the controller being further used for comparing a personal password in the password file and controlling the operation of the memory card accessing apparatus;
   a memory card interface, electrically connected to the controller, for communicating with the memory card;
   an universal interface, electrically connected to the controller for communicating with a host; and
   an encryption/decryption unit, wherein the encryption/decryption unit is disposed in the controller and has a key;
   wherein when the controller cannot find the password file in the root directory area, the controller allows the host to write a new password file into the root directory area;
   wherein when the controller finds the password file in the root directory area, the controller records a cluster of the password file and detects whether the password file is written, and the controller triggers a password comparison operation when a user of the host writes a password into the password file,
   wherein during the password comparison operation, the controller compares the password with the personal password stored in the password file from the cluster in order to identify the user, and if the password matches the personal password in the password file, the controller allows the host to access the data stored in a data area of the memory card, while if the password does not match the personal password in the password file, the controller only allows the host to read data in the root directory area and responds a predetermined response to any other read operation for reading the data stored in the data area.

8. The memory card accessing apparatus according to claim 7, wherein the memory card is a multi-media card (MMC), a secure digital (SD) card, or a compact flash (CF) card.

9. The memory card accessing apparatus according to claim 7, wherein the universal interface is a USB interface.

10. The memory card accessing apparatus according to claim 7, wherein the universal interface is an IEEE1394 interface.

11. A method of reading/writing a storage apparatus, the method comprising:
    looking for a password file stored in a root directory area of a non-volatile memory of the storage apparatus to determine whether the password file is stored in the root directory area;
    when it is determined that the password file is not stored in the root directory area, allowing a host to write a new password file into the root directory area; and
    when it is determined that the password file is stored in the root directory area, recording a cluster of the password file; detecting whether a user of the host writes a password into the password file; comparing the password with a personal password in the password file from the cluster if the user writes the password into the password file; allowing the host to perform a reading operation or a writing operation in a data area of the non-volatile memory if the password matches the personal password in the password file; and allowing the host to read data in the root directory area only and responding a predetermined response to any other read operation for reading the data stored in the data area if the password does not match the personal password in the password file.

12. The read/write method according to claim 11, wherein while performing the writing operation, the storage apparatus first encrypts data to be written using a key stored in the storage apparatus and then stores the encrypted data in the data area, and while performing the reading operation, the storage apparatus first decrypts data to be read using the key and then transmits the decrypted data.

13. A method of reading/writing a memory card accessing apparatus, the method comprising:
  looking for a password file stored in a root directory area of a memory card to determine whether the password file is stored in the root directory area;
  when it is determined that the password file is not stored in the root directory area, allowing a host to write a new password file into the root directory area; and
  when it is determined that the password file is stored in the root directory area, recording a cluster of the password file; detecting whether a user of the host writes a password into the password file; comparing the password with a personal password in the password file from the cluster if the user writes the password into the password file; allowing the host to perform a reading operation or a writing operation in a data area of the memory card if password matches the personal password in the password file; and allowing the host to read data in the root directory area only and responding a predetermined response to any other read operation for reading the data stored in the data area if the password does not match the personal password in the password file.

14. The read/write method according to claim 13, wherein while performing the writing operation, the memory card accessing apparatus first encrypts data to be written using a key stored in the memory card accessing apparatus and then stores the encrypted data in the data area, and while performing the reading operation, the memory card accessing apparatus first decrypts data to be read using the key and then transmits the decrypted data.

15. The storage apparatus according to claim 1, wherein the encryption/decryption unit uses the key to encrypt and decrypt the data stored in the data area of the non-volatile memory, and the key is different from the personal password.

16. The memory card accessing apparatus according to claim 7, wherein the encryption/decryption unit uses the key to encrypt and decrypt the data stored in the memory card, and the key is different from the personal password.

17. The read/write method according to claim 12, wherein the key is different from the personal password.

18. The read/write method according to claim 14, wherein the key is different from the personal password.

* * * * *